United States Patent [19]

Gagas

[11] 4,449,715
[45] May 22, 1984

[54] EXTERNAL MANHOLE SEAL

[76] Inventor: Michael Gagas, 5558 N. Shoreland Ave., Whitefish Bay, Wis. 53217

[21] Appl. No.: 409,644

[22] Filed: Aug. 19, 1982

[51] Int. Cl.³ .......................... F16J 15/10; E02D 29/14
[52] U.S. Cl. ................................. 277/12; 277/212 FB; 285/226
[58] Field of Search ......................... 285/57, 226; 277/212 FB, 12

[56] References Cited

U.S. PATENT DOCUMENTS

| 3,549,176 | 12/1970 | Contresas | 285/226 |
| 3,669,470 | 6/1972 | Deurloo | 285/226 |
| 4,278,262 | 7/1981 | Mizutani et al. | 277/212 FB |
| 4,345,772 | 8/1982 | Woody et al. | 277/212 FB |
| 4,368,893 | 1/1983 | Gagas | 277/12 |

Primary Examiner—Robert I. Smith
Attorney, Agent, or Firm—Ronald E. Barry

[57] ABSTRACT

An external manhole sealing assembly comprising a flexible sleeve spanning the joint between a manhole frame and a manhole casing, a frame adapter for forming a sealing surface for said sleeve, the sleeve being secured to the sealing surface on the adapter and to the manhole casing by mounting bands, the sleeve including sufficient flexibility to allow for heaving of the frame with respect to the casing.

8 Claims, 8 Drawing Figures

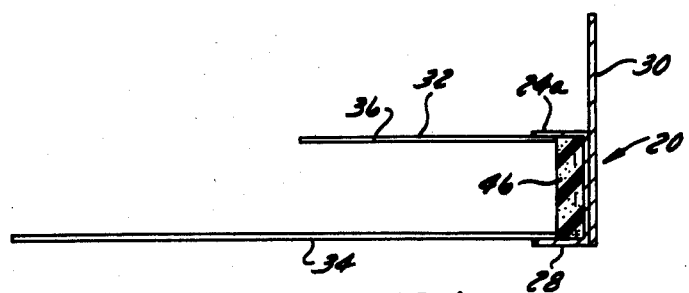
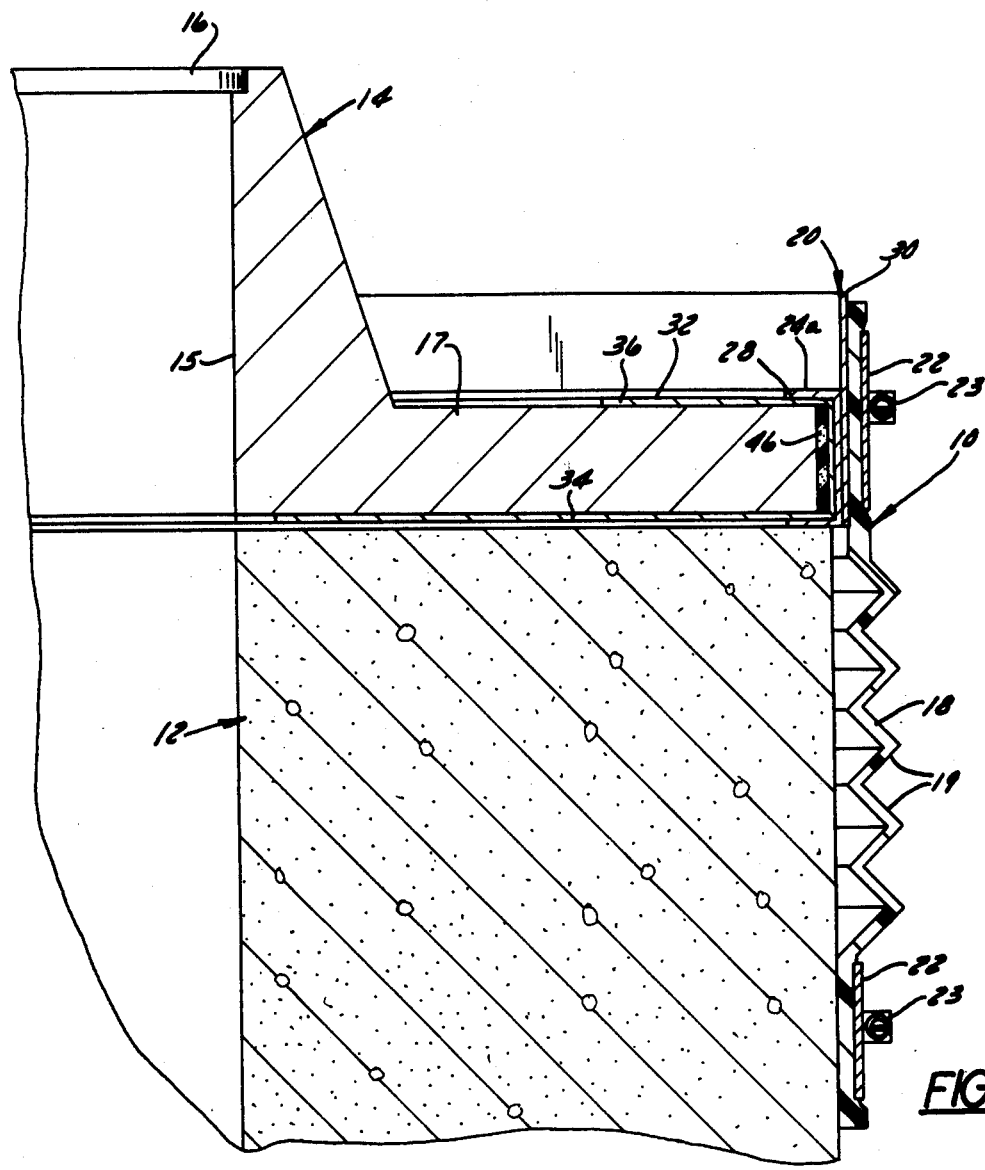

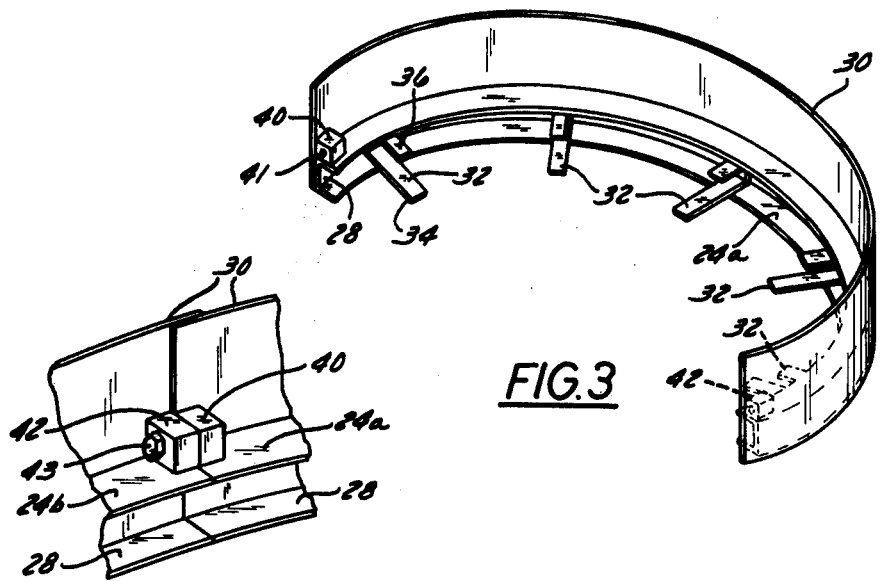
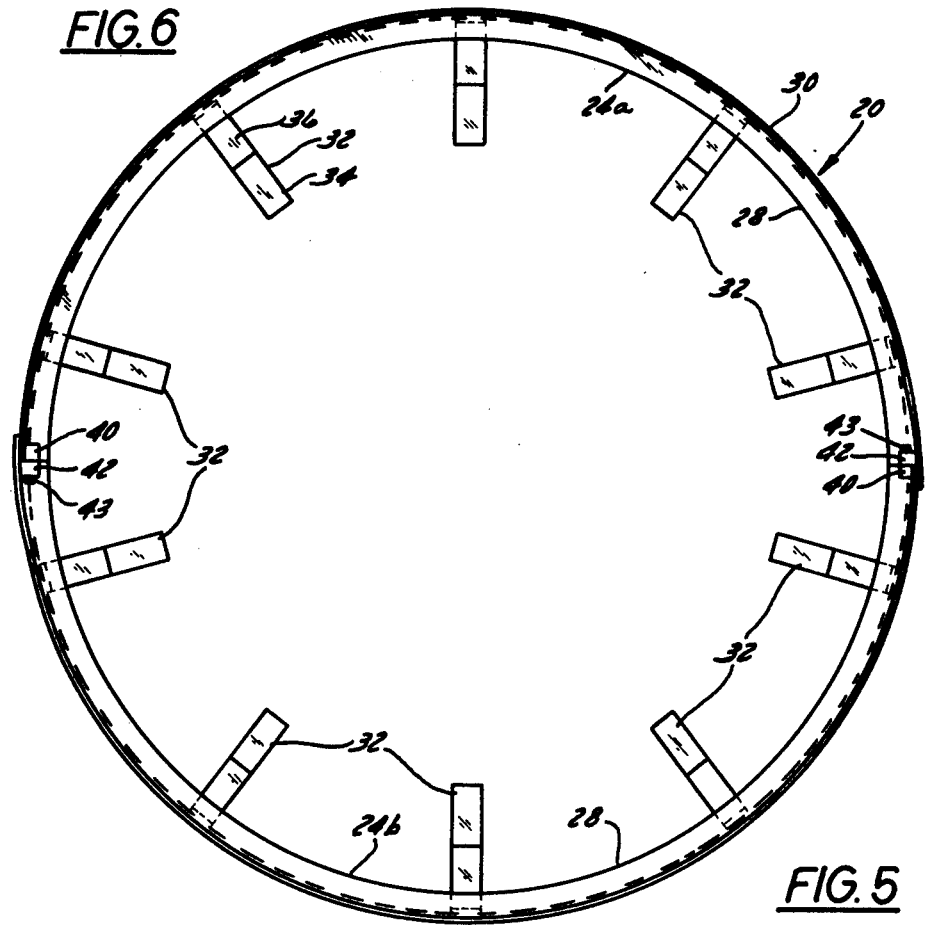

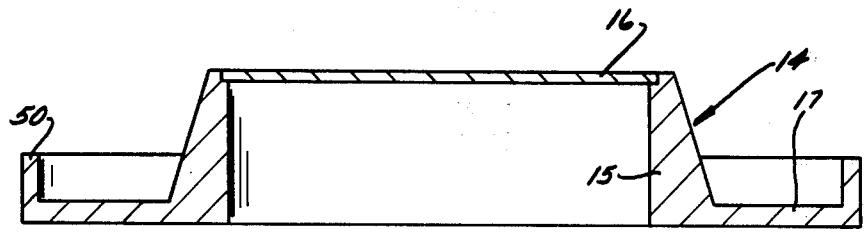
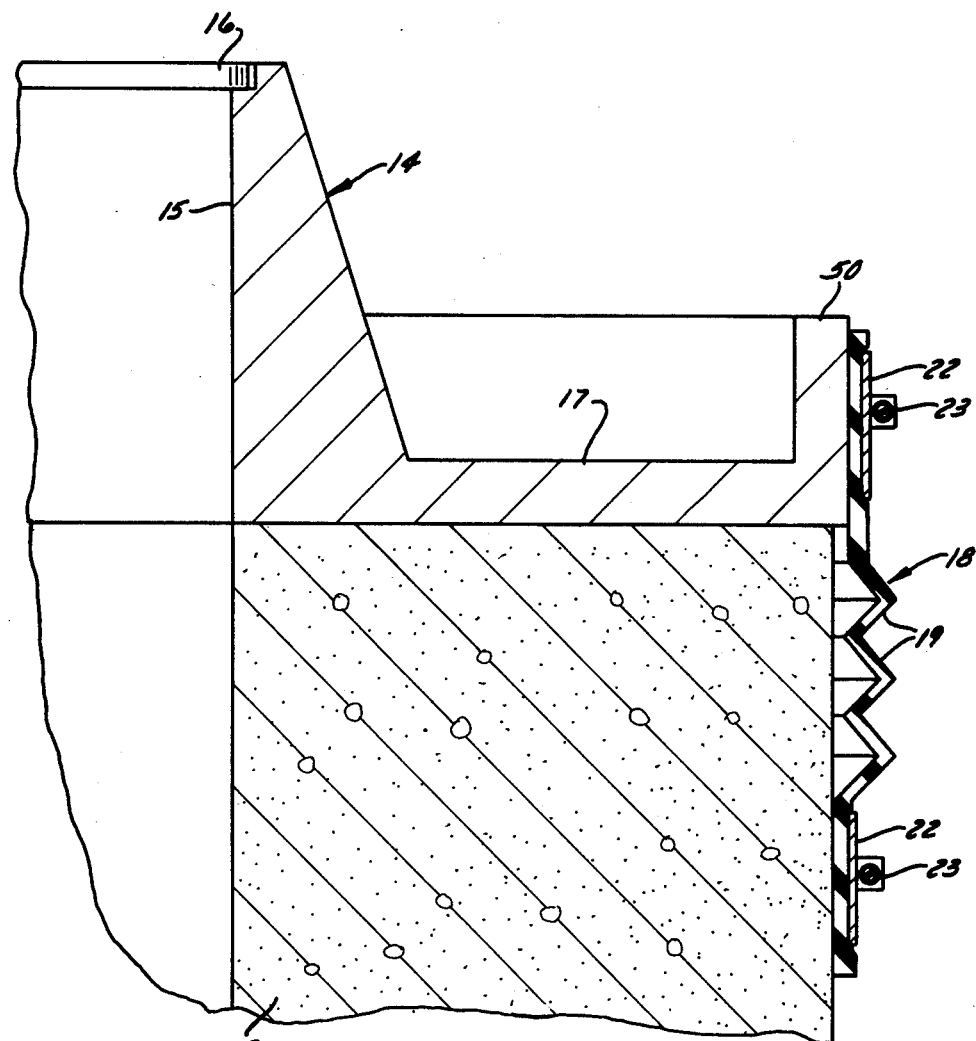

EXTERNAL MANHOLE SEAL

BACKGROUND OF THE INVENTION

Manholes of the type contemplated herein generally include an underground masonry casing, a manhole cover frame which rests on top of the casing and protrudes through the pavement of the street or the like, and a manhole cover which is supported in the manhole cover frame.

It has become necessary, due to the limited capacity of sewer systems, to separate the sewer system from storm systems. Where the storm systems are joined with the sewer systems, the increase of flow during rainstorms produces a flow beyond the capacity of the sewer system. It is, therefore, one of the objects of the present invention to prevent rain water from entering the sewer system through the manhole cover and casing.

Efforts to achieve this object have been directed primarily to internal seals which can be retrofit into existing sewer systems through the manhole cover. These seals are located between the manhole cover frame and the manhole casing to prevent seepage of rain water through the joint between the frame and the casing. These seals have been effective, however, water seeping through the joint will accumulate within the seal inside of the casing and adversely affect the life of the seal.

SUMMARY OF THE INVENTION

The manhole seal according to the present invention is designed to be mounted on the exterior of the frame and the casing to seal the joint. The seal must be sufficiently flexible to allow for "heaving" of the cover frame under adverse weather conditions. This has been achieved by providing a sleeve of a flexible material on the exterior of the casing and frame to prevent water from entering the joint. The sleeve can be sealed to the exterior of the frame by an adapter provided on the frame or directly onto a flange provided on the frame.

THE DRAWINGS

FIG. 2 is an enlarged view of a portion of FIG. 1 showing the joint between the frame and casing sealed by the seal assembly.

FIG. 3 is a perspective view of one-half of a manhole frame adapter.

FIG. 4 is a section view of the manhole adapter.

FIG. 5 is a top view of an assembled manhole adapter.

FIG. 6 is an enlarged perspective view showing the connection between the two halves of a manhole adapter.

FIG. 7 is an elevation view in section of a modified manhole frame.

FIG. 8 is an enlarged section view of the modified frame shown mounted on the casing with the seal assembly enclosing the joint between the casing and frame.

DESCRIPTION OF THE INVENTION

Figure 1:
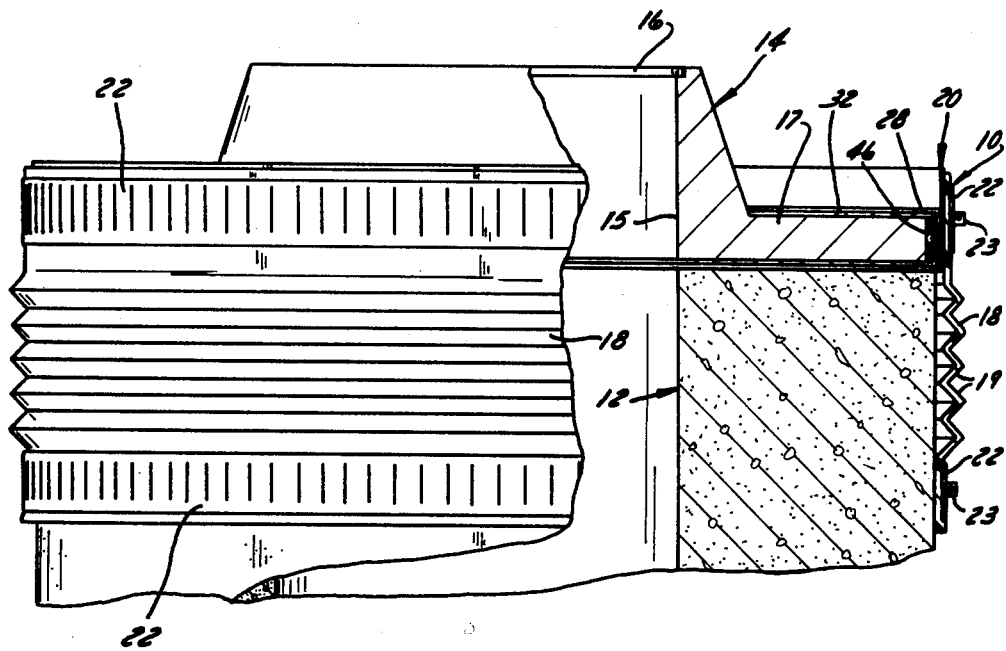
FIG. 1 is a side elevation view partly in section of a manhole cover frame and masoney casing with a seal assembly mounted thereon.

The manhole seal assembly 10 according to the invention is used to seal the joint between manhole casing 12 and a manhole cover frame 14. The manhole casing 12 is generally formed from concrete and the frame 14 is generally formed of cast iron. The frame 14 includes an open cylindrical section 15 and a horizontal mounting flange 17. A manhole cover 16 is supported at the top of the cylindrical section 15 to close the opening into the manhole casing 12.

In accordance with the invention, the exterior manhole seal assembly 10 generally includes a flexible sleeve 18 which is used to enclose the joint between the frame 14 and the casing 12. The sleeve can be formed of a rubber or Neoprene material. The sleeve 18 includes means for expanding the length of the sleeve sufficient to allow for heaving of the frame on the casing. Such means can be in the form of a number of pleats 19 provided in the sleeve or by a series of S-shaped folds. Means are provided on the frame 14 in the form of a frame adapter 20 to provide a surface for sealing the sleeve 18 to the frame.

In this regard, the frame adapter 20 includes a pair of identical semi-conductor rings 24a and 24b each of the rings 24a and 24b includes a U-shaped half ring 28 and an annular band 30 secured to the outside surface of the U-shaped ring 28 and extending upwardly therefrom to form a mounting surface for the sleeve 18. Means are provided within the ring 28 to space the ring 28 from the flange 17 on the frame. Such means is in the form of a number of mounting strips 32 provided within the U-shaped ring 28. Each of these strips 32 is bent to provide a lower spacer member or leg 34 and an upper spacer member or leg 36. The spacer is provided to accommodate a compressable seal material 46 as described hereinafter.

Means are provided at each end of the rings 24a and 24b to connect the rings together. Such means is in the form of a mounting block 40 having a threaded aperture 41 provided at one end of the ring at the top of the ring 28 on the inside surface of the band 30 and a mounting block 42 including a bolt 43 provided at the other end of this ring at the top of the ring 28 inside of the flange 30. The two rings 24a and 24b are then connected by placing the block 40 on one ring in alignment with the block 42 on this other ring with the bolt 43 in position to be threaded into the threaded aperture 41. The bolts are then turned to draw the two rings into tight engagement with the mounting flange 17 on the frame 14.

Prior to mounting the frame adapter 20 on the frame, the compressable seal strip 46 is applied to the inside surface of the ring 28. The strip 46 can be formed from a rubber gasket or a mastic such as Kent Seal No. 2. When the adapter 20 is mounted on the flange 17 the compressable material will be squeezed into the space between the ring 28 and flange 17. The legs 34 and 36 of the bands 32 maintain a space between the flange and the ring so that the compressable material 46 will not be squeezed out of the adapter.

The sleeve 18 is secured to the outside surface of the casing 12 and the adapter 20 by means of mounting bands 22. The bands 22 are formed from a strip of metal of sufficient length to encircle the casing and frame. A bolt and nut assembly 23 is provided at each end of the band to draw the upper band into tight engagement with the upper end of sleeve 18 and adapter 20 and the lower band with the bottom of sleeve 18 and the casing 12.

In the embodiment of the invention shown in FIGS. 7 and 8 an alternate means is shown for providing a sealing surface on the frame 14. Such means is in the form of a vertical lip or flange 50 formed as an integral part of the mounting flange 17. The sleeve 18 can then be mounted directly on the flange 50 by means of one of the mounting bands 22. The lower end of the sleeve being secured to the casing 12 also by means of a mounting band 22.

I claim:

1. An external manhole sealing assembly comprising
   a flexible sleeve for spanning the joint between a manhole frame having a radially extending flange and a manhole casing,
   first means for forming a first seal between said sleeve and the flange of the manhole frame, said first means including
   a U-shaped circular band adapted to be mounted on the flange and a vertical flange extending upwardly from the band to form a sealing surface for said sleeve, and
   a compressible sealing strip located between the flange and the U-shaped band to seal the space between the band and the flange, and
   second means for forming a second seal between said sleeve and the exterior of said manhole casing, thereby forming a continuous seal about the joint between the frame and the casing.

2. The manhole sealing device according to claim 1, wherein said U-shaped band includes a number of spacer strips provided on the inside surface of the U-shaped band to maintain a space for said compressible sealing strip between the U-shaped band and the flange, and
   a first circular mounting band for securing said flexible sleeve to the exterior surface of the vertical flange.

3. The manhole sealing device according to claim 1 or 2 wherein said second sealing means comprises a
   second mounting band adapted for securing the sleeve to the exterior of the casing.

4. The manhole sealing device according to claim 1 wherein said flexible sleeve includes means for expanding the length of the sleeve.

5. A manhole sealing assembly for externally sealing the joint between a manhole frame having a radially extending flange and a manhole casing, said assembly comprising
   means mounted on said flange for forming a sealing surface on the frame,
   a flexible sleeve spanning the joint between the frame and casing, said sleeve having one end encircling the sealing surface means and the other end encircling the casing,
   first means encircling said one end of the sleeve to form a seal between the sleeve and said sealing surface means, and
   second means encircling the other end of the sleeve to form a seal between the sleeve and the casing.

6. The assembly according to claim 5 wherein said sealing surface means comprises
   a frame adapter including a U-shaped band enclosing the outer edge of the frame flange, and
   a flange mounted on the outer periphery of the band and extending upwardly therefrom to form the sealing surface.

7. The assembly according to claim 5 wherein said sealing surface means comprises an annular flange formed as an integral part of the outer periphery of the frame.

8. The assembly according to claims 5, 6 or 7 wherein said flexible sleeve includes means for expanding the length of the sleeve.

* * * * *